(12) United States Patent
Charugundla

(10) Patent No.: US 8,526,581 B2
(45) Date of Patent: *Sep. 3, 2013

(54) INTERNET PROTOCOL TEXT RELAY FOR HEARING IMPAIRED USERS

(75) Inventor: Kent Charugundla, New York, NY (US)

(73) Assignee: C21 Patents, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/719,205

(22) Filed: Mar. 8, 2010

(65) Prior Publication Data

US 2010/0166155 A1     Jul. 1, 2010

Related U.S. Application Data

(63) Continuation-in-part of application No. 12/496,165, filed on Jul. 1, 2009.

(60) Provisional application No. 61/133,950, filed on Jul. 3, 2008, provisional application No. 61/162,935, filed on Mar. 24, 2009.

(51) Int. Cl.
*H04M 11/00* (2006.01)

(52) U.S. Cl.
USPC ............ 379/88.14; 379/52; 379/142.05; 455/435.1

(58) Field of Classification Search
CPC .......... H04M 3/42391; H04M 11/066; G09B 21/009
USPC .. 379/52, 88.13, 88.14, 265.09, 93.01–93.03, 379/121.06, 142.05, 142.06, 142.14; 455/435.1
See application file for complete search history.

(56) References Cited

U.S. PATENT DOCUMENTS

| | | | |
|---|---|---|---|
| 6,504,910 B1 | 1/2003 | Engleke et al. | |
| 6,735,286 B1 * | 5/2004 | Hansen et al. | 379/52 |
| 6,775,360 B2 * | 8/2004 | Davidson et al. | 379/88.14 |
| 6,950,501 B1 | 9/2005 | Chaturvedi et al. | |
| 7,027,986 B2 | 4/2006 | Caldwell et al. | |
| 7,142,642 B2 | 11/2006 | McClelland et al. | |
| 7,200,208 B2 | 4/2007 | Smith, Jr. et al. | |
| 7,236,574 B2 | 6/2007 | Haldeman et al. | |
| 7,315,612 B2 | 1/2008 | McClelland | |
| 7,319,740 B2 | 1/2008 | Engleke et al. | |
| 2006/0106602 A1 | 5/2006 | Caldwell et al. | |
| 2006/0285652 A1 | 12/2006 | McClelland et al. | |
| 2007/0036282 A1 | 2/2007 | Engleke et al. | |
| 2008/0152093 A1 | 6/2008 | Engleke et al. | |
| 2008/0187108 A1 | 8/2008 | Engleke et al. | |
| 2009/0190742 A1 * | 7/2009 | Freeman et al. | 379/265.09 |
| 2009/0262906 A1 * | 10/2009 | Goldman et al. | 379/52 |

* cited by examiner

*Primary Examiner* — Md S Elahee

(57) ABSTRACT

IP text relay or phone captioning is described herein, to facilitate communication through the use of traditional phone or VOIP or internet telephone system between people of hearing impaired and those who can hear. This service and device will enable users to communicate with users of hearing via assistance of an operator who will transcribe the call, while also receiving the Caller ID of the calling party and not the relay center.

16 Claims, 2 Drawing Sheets

INTERNET PROTOCOL TEXT RELAY FOR HEARING IMPAIRED USERS

CROSS REFERENCE TO RELATED APPLICATIONS

This application claims the benefit of U.S. Provisional Application No. 61/133,950, filed on Jul. 3, 2008 (and entitled IP Text Relay For Hearing Impaired Users) and U.S. Provisional Application No. 61/162,935, filed on Mar. 24, 2009 (and entitled Calling Party's Caller ID to a Deaf or Hard of Hearing User via Relay Service), both of which are incorporated in their entirety herein by reference.

This application is a continuation-in-part of U.S. Ser. No. 12/496,165, filed on Jul. 1, 2009 (and entitled Internet Protocol Text Relay For Hearing Impaired Users), which is incorporated in its entirety herein by reference.

BACKGROUND OF THE INVENTION

1. Field of the Invention

The present invention generally relates to the field of telecommunications. In particular, the invention relates to a system and method for assisting the hearing impaired by a communications assistant while also facilitating the calling party's Caller ID into XML text or to be shown on any telephone for hard of hearing party to see.

2. Description of the Related Art

There is a necessity for humans to communicate with one another. There have been many inventions to assist such communication, especially in the field of devices or services for the deaf. However, most of these devices have been created using BAUDOT protocol, used for modem to modem communication, which was communicating at 45.5 baud. Commonly known devices are TDD or Teletype TTY. Some of the modem devices are TDD consisting of keyboard and display with built in modem.

Due to the proliferation of the internet, the present invention will provide a mechanism for to people to communicate with each other regardless of geographic boundaries. The present invention may be used with any telephone currently available or anything that will be invented in the future to assist the communications assistant or the operator. The present invention may replace many of those devices as it uses internet protocol which works over a global communications network. The present invention will further assist companies and service providers who are in the business of translating and transcribing.

The advantage of this invention described herein will allow the end user device to receive text or captioned text to be displayed. The words spoken by the called party will be transcribed by an operator or communications assistant for streaming as text to the device of an end user who is hearing impaired. The device may be any of IP phone, Blackberry, WM-Windows Mobile, Symbian (an operating system of NOKIA), Java, Flash, XML, etc., as is well known to those skilled in the art.

Accordingly, there is now provided with this invention an improved communications system for the hearing impaired effectively overcoming the aforementioned difficulties and longstanding problems inherent in the voice communication field. Additionally, this invention further promotes functional equivalency for the hard of hearing by providing Caller ID of the calling party instead of the Caller ID of the relay service provider. Other service providers currently providing IP CTS or IP Relay lack caller ID functionalities for the hard of hearing.

SUMMARY OF THE INVENTION

According to one aspect of the invention, a system for communication is disclosed comprising a first telephone for transmitting and receiving voice and text by IP communication, a transceiving device for transmitting and receiving voice and text communication connected by ip to the first telephone, and a second telephone operatively connected to said transceiving device for transmitting voice communication thereto. The transceiving device provides the calling party's caller identification.

Another aspect of the invention includes a method of communication comprising sending a first voice communication from a first telephone to a second telephone through a transceiving device and receiving a text message from the transceiving device. The text message is a text of a voice communication from the second telephone in response to the first voice communication.

Still another aspect of the invention includes a method of communication comprising receiving on a transceiving device a first voice communication from a first telephone connected by ip to a second telephone and providing text transcription of the voice communication from the second telephone to the first telephone by the transceiving device.

Still another aspect of the invention includes a method of communication which displays the caller ID of the calling party to the hard of hearing party, and vice versa, and not the caller ID of the service provider. Through the use of other service providers and their current technology, the hard of hearing user has no idea who's calling him or her until the calling party reveals him or herself in voice and/or via captioning to the hard of hearing user.

As will be appreciated by those persons skilled in the art, a major advantage provided by the present invention is that hard of hearing persons may communicate by means of a telephone to persons who can hear, as well as benefit from a Caller ID pass through feature which is unavailable through other current service providers in the market today. Additional objects of the present invention will become apparent from the following description.

The method and apparatus of the present invention will be better understood by reference to the following detailed discussion of specific embodiments and the attached figures which illustrate and exemplify such embodiments.

DESCRIPTION OF THE DRAWINGS

A specific embodiment of the present invention will be described with reference to the following drawings, wherein.

DESCRIPTION OF THE PREFERRED EMBODIMENT

The following preferred embodiment as exemplified by the drawings is illustrative of the invention and is not intended to limit the invention as encompassed by the claims of this application.

A system and method for providing communication for a hearing impaired person is disclosed herein using the following definitions and abbreviations:

ACD: Automatic Call Distribution, software or hardware based systems with ACD software generally used in call centers.

SQL: Structured Query Language, used for Database

ANI: Automatic Number Identification or Caller ID

DNIS: Dialed Number Identification Service. This allows a service provider or call center agent to know which number the caller dialed or wishes to dial.

CRM: Customer Relationship Manager. This is typically used by call centers and their agents to manage the call or treat the call in a window.

Stored Procedure: a function in SQL which updates/writes to the SQL Database. This functions as a small program.

IP Phone: Any Internal Protocol based phone, for example, a Cisco 7960 which is capable of receiving XML feed.

URL: Uniform Resource Locator. This is commonly known as a web address.

XML: Extended Mark-up Language, as is commonly used in websites.

Service URL: a pre-determined route which allows an IP phone to fetch its XML/Data feed.

DB: Database

Caller ID: Automatic display of caller's telephone number on recipient's phone.

Relay center: An intermediate between the connection of a caller's telephone and a recipient's telephone for the use of a person hard of hearing. Such a relay center is commonly referred to in the industry as "Services for the Deaf", "Captioning Service", "IP Relay Center", "Relay Center for the Deaf", a transceiving device, or the like.

Figure 1:
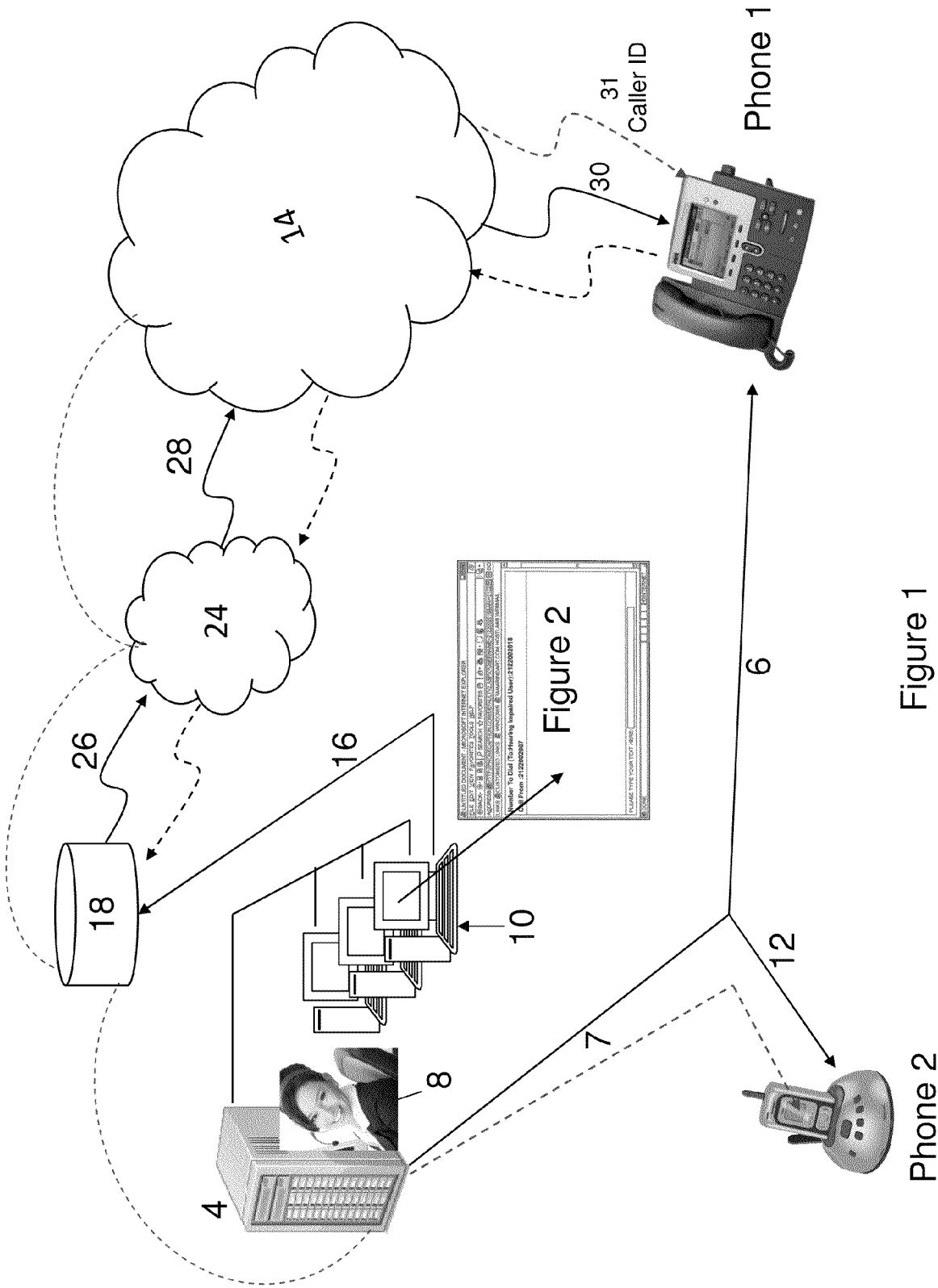
FIG. 1 is a schematic representation of the system of the present invention.

The system, as illustrated generally in FIG. 1 shows a telecommunications system between a phone 1 and a phone 2. The user of the phone 1, as contemplated here, would be typically a hearing impaired person or one commonly referred to as hard of hearing. The user of phone 2 would typically be a person who can hear.

In order for a hearing impaired person to use the telecommunications system of the present invention, which would enable phone 1 to receive the text transcription of the voice communication of phone 2, the user of phone 1 must be a registered user. To register for the service, the hearing impaired customer must first visit a hosting website, such as PhoneCaption.com. To register for use, the hearing impaired person would typically enter personal profile data, for example, first and last name, address, primary phone number (the one on which he wants to receive text), and his e-mail address.

Upon entering the above information, the user is authenticated or registered and typically provided with an 800- or 888- or 10-digit number provided by the relay service, which is matched with their primary registered number where they will be receiving the phone calls. The user of phone 1 would give out this 800- or 888- or any other ten-digit number assigned by the relay service provider to their friends, family, or business associates where they will be receiving calls. Upon registration and authentication of such a user, the user is in the database of the service provider so that he or she can make or receive phone calls with transcriptions.

When the phone 1 user wishes to make a call, he/she calls the pre-assigned 800-number for their account and when prompted, he/she enters the number they wish to call, or Phone 1 user can dial a direct 10-digit number of Phone 2. Phone 2, however, does not have to be a registered user as he/she can hear/speak and has no need for transcription or captioning. When phone 2 receives a phone call, that phone call must be originated from phone 1 via the 800- or ten-digit number assigned by the relay service provider or direct dial 10-digit number, to use captioning service, it shall show Caller ID of Phone 1 through the following process. When the call is received at the call/relay center, the system shall see the incoming Caller ID of Phone 1. When the second leg of the call is made from the CA to Phone 2, the system shall appear to the phone company as "Caller ID" of Phone 1 so that the Caller ID of Phone 1 is released to Phone 2. The system will recognize Phone 1 user's Caller ID and shall store the same in a temporary database to be forwarded to Phone 2 when the call is delivered. Phone 1's Caller ID passing through the local phone network or IP network delivered to the call center. At the call center, the database server which maintains the intelligence of all call traffic/call treatment/CRM/ACD shall accept the Caller ID and send the same on the outgoing call thus enabling the Caller ID of Phone 1 to be displayed on Phone 2.

Phone 1 may be an IP phone or any phone capable of displaying text from an internet connection, for example, IP Phone, BlackBerry, WM-Windows Mobile, Symbian (an operating system of NOKIA), Java, Flash, XML, etc. Phone 1 may be any telephone from any carrier with the ability to fetch XML text by having the service URL programmed into the phone. Phone 1, having auto refresh, would get the newest text in XML format automatically.

The phone 1 is operatively connected to an ACD (automatic call distribution) relay center 4 by connections 6 and 7. Such connections 6 and 7 may be any type of connection regardless of connection media, for example, internet, wireless, 3G, GSM, TDMA, CDMA, or any packetized network. The user's phone 1 may further include any connected devices necessary to perform multi linked duplex communication and any internet connected device(s) capable of displaying internet content to perform communication.

An agent or a communications assistant 8 would typically use a headset connected to a computer 10. Of course, as is well known in the art, the agent may be wholly or partly replaced by voice recognition software capable of providing a text transcription of voice communication. The computer 10, running CRM and speech recognition software would be operatively connected to the ACD relay center 4 by any connection capable accepting calls from the ACD environment regardless of connection media, for example, wireless, 3g, gsm, tdma, cdma or any packetized network. The ACD relay center would be further connected by connection 12 to a party with whom the user wishes to communicate using phone 2. Connection 12 may be any internet connection regardless of connection media, for example, wireless, 3g, gsm, tdma, cdma or any packetized network. The ACD relay center, has the wherewithal to accept the Caller ID, route the call and conference the call with an operator or communications assistant/agent. In the process of setting up this conference call between three parties, the program has the intelligence to move the Caller ID data from the incoming line of Phone 1 through the outgoing line to Phone 2 while maintaining the relay operator or communications assistant in an inert position without its own Caller ID identification during the conference call.

The ACD relay center is connected to the internet 14 by connection 16 to a database server 18. Connection 16 is a multi linked, multi tier ip capable of handling multiple calls. The operator 8 together with the computer 10 and database server 18 includes any devices necessary to perform multi-linked duplex communication. Updated text, including Caller ID of the originating phone, from the relay center is sent to the database 18 which has wherewithal to hold the Caller ID and to re-insert Caller ID into the outgoing call during a conference call set up with Phone 2 which will be delivered to either internet or via traditional telephone company.

The database is connected to the internet 14 via a web server 24 and connections 26 and 28. This server is typically a Service URL Server. Phone 1 may be connected to the internet by connection 30 whereby the service URL responds to phone 1 with updated text.

In use, the system of the present invention operates as a captioned telephone relay service and a method by which a stream of text may be provided a hearing impaired person. For example, a hearing impaired person, using phone 1 may wish to call a person of hearing on phone 2. Although phone 1 dials the number of phone 2, the outbound call is directed to the ACD relay center. To the hearing impaired person, it may appear as a regular connection. However, the reply to all of the voice communication from the hearing impaired person is a text transcription of the voice communication from the callee as transcribed by an agent or software at the ACD location. Phone 1's Caller ID is being delivered to Phone 2 as though he called Phone 2 directly instead of sending Caller ID of ACD center. This enables the hard of hearing user to maintain his own identity as though he made the call. This type of identity is essential as we see in the normal course of business, a person may call a credit card company or any other company which relies on the caller's Caller ID to identify the caller. Furthermore, this functionality provides functional equivalency to the hard of hearing user so that he or she may not be identified as a hard of hearing person who needs relay assistance to the called party, thus eliminating any discrimination. Most deaf and hard of hearing individuals do not like their callers to know they are using a relay center.

In reverse, a person of hearing from phone 2 may call the ACD relay center to request the operator connection with a hearing impaired user of phone 1. Once the call has been established among the parties, Caller ID of Phone 2 is being delivered to Phone 1 and the operator will continuously transcribe the conversation for transmission of text to the end user until the completion of the call.

Figure 2:
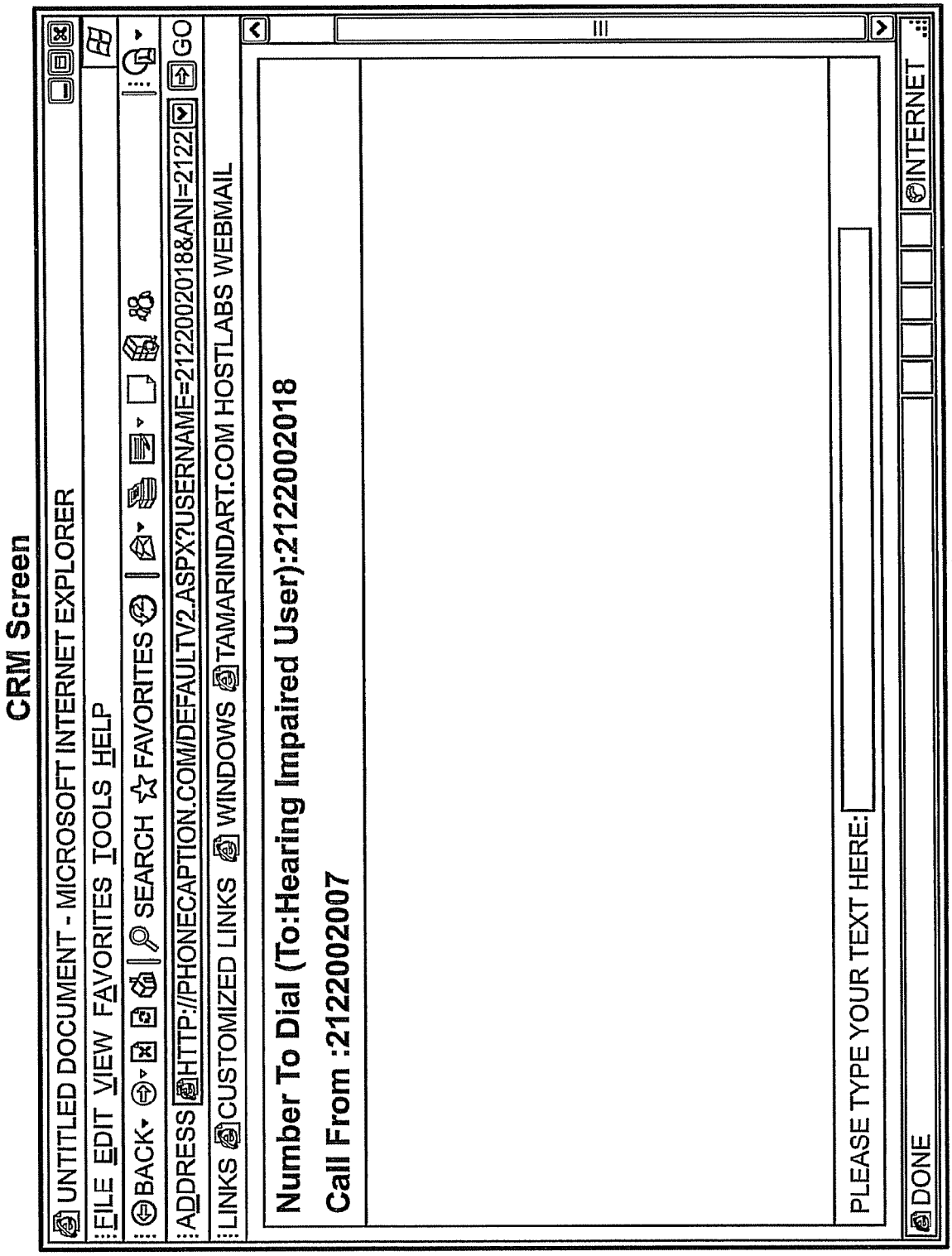
FIG. 2 is a typical screen shot of the agent receiving a call request from a person of hearing to a hearing impaired person.

When a person of hearing from phone 2 calls a hard of hearing person at phone 1, the call first arrives at the ACD. The ACD connects to the database SQL and determines the type of call to route the call to the agent along with call information. Such call information would be, for example, ANI/DNIS, Caller ID with the CRM Integration for that call. The agent then accepts the call with the information and makes a call to the person hard of hearing at phone 1 based on the information provided from the CRM, for example, the phone number. FIG. 2 illustrates the screen of the agent receiving such information. Phone 1 then answers the call. When Phone 1 receives the call, the Caller ID shown on his telephone will be that of Phone 2. The agent conferences phone 1 and phone 2 together so that both parties can hear each other. The agent listens into the conference (three party call) and transcribes the voice of phone 2 into text delivered to SQL. The stored procedure updates the new text automatically to the database on the SQL Server. Typically, the agent will use both his own typing skills together with the assistance of speech recognition software to transcribe the text. Of course, as is known to those skilled in the art, this transcription may be performed either entirely or in part by software.

This process is possible through the agent's CRM integration with the data base (SQL residing on the SQL server). Phone 1 is preregistered with a relay/caption service provider and serviced by any carrier, and programmed with a Service URL directed to Service URL Server.

At phone 1's request, the Service URL transmits the latest transcribed text in XML format. The Service URL Server fetches the data from the DB every time phone 1 makes a request. Text from the Service URL is seen on the screen of phone 1. As the URL auto refreshes, the XML is updated with the latest data/text. The new text is seen on the screen of phone 1.

Thus, the present invention discloses a process by which a device or service can facilitate communication between persons of hearing and those hard of hearing using any IP telecommunication device. The hard of hearing user will be able to receive text over any IP display device which is being transcribed by an operator or software from an interne connected computer. In this way, a hard of hearing person will be able to see the Caller ID of incoming call of the hearing party and hear the voice of the party over the phone alongside seeing the same transcribed into text over the display of an IP device. The procedure automatically updates the text to hard of hearing users. The text is delivered to the hard of hearing user by means of XML.

In the business of Captioned Phone Service, as of today no one else in the industry has created the technology to send Caller ID from calling party to called party or vice versa. Instead the Caller ID of the call center or relay center or captioning center is delivered. This type of service is not functionally equivalent to the hard of hearing community.

Although the particular embodiments shown and described above will prove to be useful in many applications in the hearing impaired communication field and the general art of text communication and sending and receiving caller ID, to which the present invention pertains, further modifications of the present invention will occur to persons skilled in the art. All such modifications are deemed to be within the scope and spirit of the present invention as defined by the appended claims.

What is claimed is:
1. A system for communication, comprising:
a transceiving device for registering a telephone user for voice transcribing services based on user information received by the transceiving device through a website, and upon registration, the transceiving device is capable of automatically connecting to a telephone of the registered user via an IP connection, wherein the user information comprises a user primary telephone number and the transceiving device assigns a telephone number to the registered user telephone that is matched to the user primary telephone number,
and the transceiving device is also capable of automatically establishing telephone calls originated by the registered user telephone and telephone calls originated by another telephone calling the registered user telephone whereby
in establishing a telephone call between the registered user telephone and another telephone in which the transceiving device is connected to the registered telephone via an IP connection, the transceiving device provides caller id information of the other telephone to the registered user telephone and provides caller id information of the registered user telephone to the other telephone, and after having established the telephone call and during the established telephone call between the telephones in which the transceiving device is connected to the registered user telephone via an IP connection, the transceiving device relays voice communications between the registered telephone and the other telephone, and further the transceiving device transcribes voice communications from the other telephone into text and transmits such text along with the voice communications from the other telephone to the registered user telephone via the IP connection.

2. The system of claim 1, wherein the text is XML text.

3. The system of claim 1, wherein voice recognition software is used to provide at least a portion of the text.

4. The system of claim 1, wherein said transceiving device provides streaming text transmission of the voice communications from the other telephone in real time.

5. The system of claim 1 wherein the registered telephone is an IP telephone.

6. The system of claim 1 wherein the transceiving device comprises and ACD relay center having a computer capable of executing voice recognition software and said computer is connected to a database via an internet connection where said database is connected to a Service URL web server and the internet connection is a multi-linked, multi-tier IP capable of handling multiple telephone calls.

7. A method of communication, comprising:
registering, by a transceiving device, a telephone user requesting registration wherein the transceiving device receives user information through a website and wherein the user information comprises a user primary telephone number that is matched to a telephone number assigned by the transceiving device to a registered user telephone;
connecting automatically, by the transceiving device, a registered user telephone to the transceiving device via an IP connection;
relaying, by the transceiving device, voice communications between the registered user telephone and another telephone during a telephone call established by the transceiving device;
providing, by the transceiving device while establishing the telephone call, caller id information of the registered user telephone to the other telephone and caller id information of the other telephone to the registered user telephone; and
transcribing, by the transceiving device during the established telephone call, voice communications from the other telephone into text and the transceiving device transmitting such text along with the voice communications from the other telephone to the registered telephone user via the IP connection.

8. The method of claim 7, wherein the text is XML text.

9. The method of claim 7, wherein voice recognition software is used to provide at least a portion of the text.

10. The method of claim 7, wherein the text is a real time transcription of the voice communications from the other telephone.

11. The system of claim 5 wherein the IP telephone is capable of receiving an XML feed.

12. The system of claim 5 wherein the IP telephone comprises devices capable of performing multi-linked duplex communications and devices capable of displaying internet content to perform communication.

13. The method of claim 7 wherein the registered telephone is an IP telephone.

14. The method of claim 13 wherein the IP telephone is capable of receiving an XML feed.

15. The method of claim 7 wherein the IP telephone comprises devices capable of performing multi-linked duplex communications and devices capable of displaying internet content to perform communication.

16. The method of claim 7 wherein the transceiving device comprises and ACD relay center having a computer capable of executing voice recognition software and said computer is connected to a database via an internet connection where said database is connected to a Service URL web server and the internet connection is a multi-linked, multi-tier IP capable of handling multiple telephone calls.

* * * * *